United States Patent
Cottarel et al.

(10) Patent No.: US 9,170,729 B2
(45) Date of Patent: Oct. 27, 2015

(54) METHOD OF CONTROLLING A TOUCH-SURFACE CONTROL DEVICE AND CORRESPONDING CONTROL DEVICE

(75) Inventors: Bruno Cottarel, Annemasse (FR);
Florent De Vaux Bidon, Annemasse (FR); Cedric Chartrain, Annemasse (FR)

(73) Assignee: DAV, Créteil (FR)

( * ) Notice: Subject to any disclaimer, the term of this patent is extended or adjusted under 35 U.S.C. 154(b) by 486 days.

(21) Appl. No.: 12/747,682

(22) PCT Filed: Dec. 19, 2008

(86) PCT No.: PCT/EP2008/068011
§ 371 (c)(1),
(2), (4) Date: Oct. 18, 2010

(87) PCT Pub. No.: WO2009/083493
PCT Pub. Date: Jul. 9, 2009

(65) Prior Publication Data
US 2011/0037709 A1    Feb. 17, 2011

(30) Foreign Application Priority Data
Dec. 20, 2007  (FR) .................................. 07 08912

(51) Int. Cl.
*G06F 3/0488*    (2013.01)
(52) U.S. Cl.
CPC ................................ *G06F 3/04883* (2013.01)

(58) Field of Classification Search
CPC ............. G06F 3/041; G09G 5/00; G06K 9/42
USPC ................ 345/173, 156, 684; 341/20; 382/47
See application file for complete search history.

(56) References Cited

U.S. PATENT DOCUMENTS

| 4,810,992 | A   | 3/1989 | Eventoff |
| 5,008,497 | A   | 4/1991 | Asher |
| 5,325,447 | A * | 6/1994 | Vogt, III ........................ 382/102 |

(Continued)

FOREIGN PATENT DOCUMENTS

| EP | 0 541 102 A1 | 5/1993 |
| FR | 2 683 649 A1 | 5/1993 |
| WO | 2006/066715 A2 | 6/2006 |

OTHER PUBLICATIONS

International Search Report w/translation from PCT/EP2008/068011 dated May 13, 2009 (4 pages).

*Primary Examiner* — Quan-Zhen Wang
*Assistant Examiner* — Yuk Chow
(74) *Attorney, Agent, or Firm* — Osha Liang LLP

(57) ABSTRACT

The invention relates to a method of controlling a touch-surface control device characterized in that it comprises a step of shape recognition of a control trajectory on a touch surface from among at least two predefined shapes of trajectory, in which in the course of a predetermined duration (dT): the control trajectory is sampled in order to determine a sampled angle (dθ) of the control trajectory for each sampling period (Te), a parameter representative of the evolution of at least two sampled angles (dθ) is compared with a predetermined threshold, and a predefined trajectory shape is assigned to the control trajectory as a function of the result of the comparison. The invention also relates to a control device comprising a tough surface characterized in that it comprises a processing unit for implementing a control method as described above.

8 Claims, 3 Drawing Sheets

(56) References Cited

U.S. PATENT DOCUMENTS

| | | |
|---|---|---|
| 6,639,584 B1 | 10/2003 | Li |
| 7,446,754 B2 * | 11/2008 | Ausbeck, Jr. ............. 345/156 |
| 8,059,099 B2 * | 11/2011 | Lampell et al. ............. 345/173 |
| 2003/0174149 A1 * | 9/2003 | Fujisaki et al. ............. 345/684 |
| 2007/0083325 A1 | 4/2007 | Baba et al. |
| 2009/0213085 A1 * | 8/2009 | Zhen et al. ............. 345/173 |

* cited by examiner

METHOD OF CONTROLLING A TOUCH-SURFACE CONTROL DEVICE AND CORRESPONDING CONTROL DEVICE

The present invention relates to a method of controlling a touch-surface control device. The invention also relates to a corresponding touch-surface control device using, in particular, pressure-sensitive resistors (also known by the name FSR sensor standing for "Force Sensing Resistor").

The invention applies more particularly to the control of an electrical or electronic member of a motor vehicle such as the control of a multimedia screen or of an air-conditioning system.

Currently, motor vehicles are increasingly being equipped with electronic assistance and comfort systems for the driver and his passengers.

Electronic systems are constantly being improved and offer ever more adjustment parameters. Thus, audio systems now practically all comprise various groups of loudspeakers for which it is possible to adjust the left/right and front/rear balance. In respect of air-conditioning systems, the appearance has recently been seen of zone-based management of air-conditioning parameter adjustments.

All these systems require suitably adapted control means which are ergonomic and easy to use.

To facilitate the controls in a motor vehicle and decrease the number of individual controls, multifunction controls associated with a display screen have made their appearance in the automobile sector.

These known controls have for example the form of a control handle or joystick making it possible to navigate around a menu displayed on the screen. The selection of a chosen function is carried out for example by pressing the grip element of the control.

These joysticks are sometimes fitted with a rotary control member which makes it possible for example to increase or to decrease the volume of an audio system when this volume adjustment function has been chosen.

Thus, with a single multifunction control, it is possible to control a multitude of electronic systems and functions in a motor vehicle.

It has been proposed, more recently, that touch surfaces be used for these controls, making it possible to detect a simple press of a user's finger so as to trigger a particular type of action or control as a function of the position of the detected press and/or of the subsequent displacement of this press on the surface.

These touch surfaces are increasingly using the technology of pressure-sensitive resistors, which are outpacing other equivalent technologies, such as for example capacitive or else optical technologies, by virtue of its ease of implementation and its robustness.

Such sensors are for example known by the name "digitizer pad" and the following documents are cited as prior art: U.S. Pat. No. 4,810,992, U.S. Pat. No. 5,008,497, FR 2683649 or else EP 0 541 102.

These sensors comprise semi-conducting layers sandwiched between for example a conducting layer and a resistive layer. By exerting a pressure on the FSR layer, its ohmic resistance decreases, thus making it possible, by applying a suitable voltage, to measure the pressure applied and/or the location of the place where the pressure is exerted.

The coordinates delivered by the sensor are thereafter utilized for the control of an electrical specific function associated with the zone touched by the user's finger.

To control a multitude of electronic systems and functions on the basis of a touch surface, it is then necessary to detect the control trajectory of the finger of a user so as to associate a particular control therewith.

For this purpose, touch surfaces whose shape guides the user's finger are in particular provided.

For example, ring-shaped touch-surface sensors or ones shaped in the form of circular arc bands or else in the form of rectilinear bands are known.

Moreover, when the touch surface exhibits an arbitrary shape, other control modules comprising processing units implementing calculation algorithms for shape recognition of the trajectory of a control finger are known.

However, these functions require a considerable memory capacity and give rise to hefty calculation times that are often incompatible with the constraints related to the automobile industry.

Indeed, cost and bulkiness specifications require the use of small microcontrollers of low capacity that may be for example, integrated into the front console of a vehicle so as to control the electronic or electrical members of the vehicle.

The aim of the present invention is therefore to propose a control method and a touch-surface control device making it possible to control a multitude of electronic systems and functions that are adapted for microcontrollers of small capacity and low cost.

For this purpose, the subject of the invention is a method of controlling a touch-surface control device characterized in that it comprises a step of shape recognition of a control trajectory on a touch surface from among at least two predefined trajectory shapes, in which in the course of a predetermined duration:

the control trajectory is sampled so as to determine a sampled angle of the control trajectory for each sampling period, a parameter representative of the evolution of at least two sampled angles is compared with a predetermined threshold and, a predefined trajectory shape is assigned to the control trajectory as a function of the result of the comparison.

According to other characteristics of the control method:

said representative parameter is the sum of the deviations between the sampled angles and a mean of the sampled angles, a circular trajectory is assigned to the control trajectory when said representative parameter is greater than the predetermined threshold and a rectilinear trajectory is assigned to the control trajectory when said parameter is less than or equal to said threshold, the circular or rectilinear trajectories allow the parametrization or the selection of a control, in the course of the predetermined duration of the recognition step, a length of displacement of the control trajectory is furthermore determined, the length of displacement of the control trajectory is compared with a predetermined distance and a stationary trajectory is assigned to the control trajectory if the length of displacement of the control trajectory is less than the predetermined distance, the stationary trajectory allows a validation or a function selection, after the comparison of the recognition step, the shape of the predefined trajectory is assigned to the control trajectory if the shape of the predefined trajectory satisfies an additional validation criterion, the additional validation criterion is satisfied when a pressing force detected on the touch surface is greater than a predefined force, the sampling period is variable.

The subject of the invention is also a control device comprising a touch surface characterized in that it comprises a processing unit for the implementation of a control method such as previously described.

Preferably, the control device is able to control the functions of at least one set of electrical or electronic members of a motor vehicle, such as an air-conditioning system, an audio system, a navigation system, a telephone system, motorized window winder controls, controls for adjusting exterior rear-view mirrors, controls for adjusting the position of a sunroof, controls for interior lighting, controls for adjusting a motor vehicle seat.

Other advantages and characteristics will become apparent on reading the description of the invention, as well as the appended drawings in which.

In these figures, identical elements bear the same reference numbers. For the sake of clarity, the steps of the control method are numbered from 100.

Figure 1:
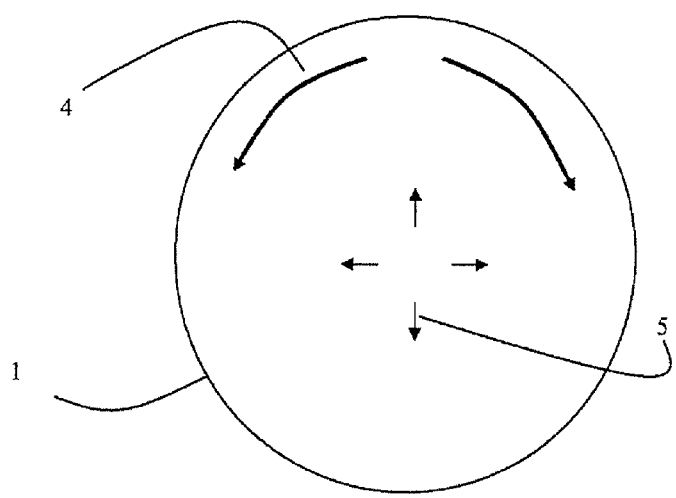
FIG. 1 is an example of a touch surface 1 of a control device.

FIG. 1 represents a touch surface 1, in particular intended to be integrated into a control device able to control the functions of at least one set of electrical or electronic members of a motor vehicle, such as an air-conditioning system, an audio system, a navigation system, a telephone system, motorized window winder controls, controls for adjusting exterior rear-view mirrors, controls for adjusting the position of a sunroof, controls for interior lighting, controls for adjusting a motor vehicle seat.

For example, in the case of an audio system, a circular control trajectory makes it possible to control the volume and the direction of rotation makes it possible to select up or down for the latter (arrows 4).

Also, it is possible to envisage that a rectilinear trajectory allows a change of CD or the selection of a title from among the titles of a selected CD (arrows 5).

The touch surface 1 uses for example sensors of pressure-sensitive resistors (also known by the name FSR sensor standing for "Force Sensing Resistor") and, is able to provide a signal to a control device processing unit, corresponding to a zone of pressing of a user's finger applied to the touch surface 1.

A pressing zone corresponds to a pressure applied by a control finger for example by modifying the ohmic resistance of the pressure-sensitive resistor sensor of the touch surface 1.

Through the application of a suitable voltage, the processing unit measures the signal corresponding to the pressure applied and/or the location of the place where the pressure is exerted on the touch surface 1.

The processing unit of the control device, such as a microcontroller, for example of 8-bit type, comprises a program memory, for the implementation of software able to execute a control detection method.

Figure 2:
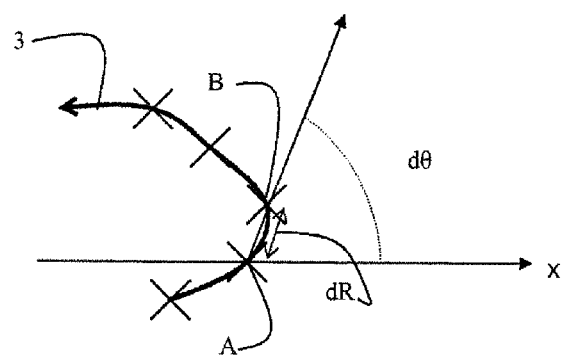
FIG. 2 is a diagram representing a control trajectory.

An exemplary trajectory of arbitrary shape 3 has been represented in FIG. 2.

The control method comprises a step of shape recognition of a control trajectory on a touch surface from among at least two predefined trajectory shapes.

A rectilinear trajectory, a circular trajectory or a stationary trajectory are three examples of predefined trajectory shapes.

In the course of a predetermined duration dT of the recognition step, the control trajectory is firstly sampled so as to determine a sampled angle dθ of the control trajectory for each sampling period Te.

The sampling period Te is for example a clock period of the processing unit, for example of the order of 10 msec.

The predetermined duration dT is equal to or greater than twice the sampling period Te.

The sampling period Te can be variable.

In the trajectory of FIG. 2, five samplings of the angle dθ of the control trajectory 3 are carried out.

The sampled angle dθ corresponds to the angle of the control trajectory relating to an axis (the horizontal axis X in this example) between two successive presses A and B spaced apart by the sampling period Te.

Next, a parameter representative of the evolution of at least two sampled angles dθ is compared with a predetermined threshold and a predefined trajectory shape is assigned to the control trajectory as a function of the result of the comparison.

Thus, a circular arc trajectory can easily be distinguished from a straight line.

Furthermore, by virtue of this method, the touch surface can be perfectly plane and of arbitrary shape.

The sampled angle dθ of the control trajectory 3 can be obtained by various calculation algorithms.

According to one embodiment, the deviations E between the sampled angle dθ and a mean Mdθ of the sampled angles dθ are determined, and then the parameter representative of the evolution of the sampled angles dθ is calculated by taking the sum of the deviations E.

Thus, the method can easily recognize a straight line from a curve even if the trajectory is not perfectly circular or perfectly straight.

It is also possible to envisage that the parameter representative of the evolution of the sampled angles dθ is the standard deviation of the sampled angles dθ with respect to a mean of the sampled angles Mdθ.

Advantageously, a circular trajectory is assigned to the control trajectory when the representative parameter is greater than the predetermined threshold and a rectilinear trajectory is assigned to the control trajectory when the representative parameter is less than or equal to the predetermined threshold.

For example, the predetermined threshold is around 20°.

Figure 3:
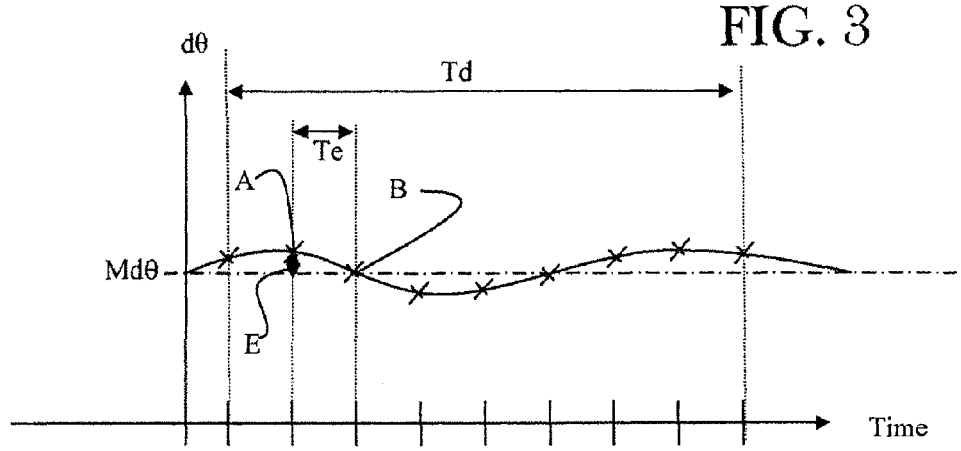
FIG. 3 illustrates a temporal evolution of a sampled angle for a substantially rectilinear trajectory.

Thus, an exemplary evolution of nine sampled angles dθ of a control trajectory in the course of a predetermined duration Td has been represented in FIG. 3.

The mean of the sampled angles Mdθ of the control trajectory is illustrated by the dotted horizontal line. The interval E corresponds to the deviation between the sampled angle dθ and the mean Mdθ.

As may be noted in FIG. 3, the evolution of the sampled angles dθ is almost constant.

Thus, the sum of the deviations E is almost zero. It is therefore possible to assign a rectilinear trajectory to the control trajectory.

Figure 4:
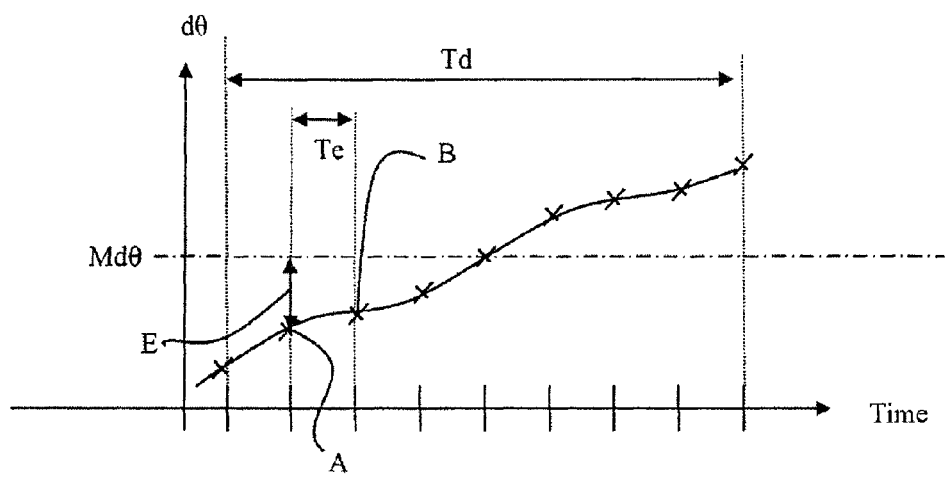
FIG. 4 illustrates a temporal evolution of a sampled angle for a substantially circular trajectory and, FIG. 5 is a flowchart showing the various steps of an exemplary control method.

A second evolution of sampled angles dθ of a control trajectory in the course of a predetermined duration Td has been represented in FIG. 4.

In this example, the sum of the deviations E is bigger and is greater than the predetermined threshold. Thus a circular trajectory is assigned to the control trajectory.

Advantageously, the circular or rectilinear trajectories allow the parametrization or the selection of a control.

It is furthermore possible to envisage that in the course of the predetermined duration dT of the recognition step, a length of displacement of the control trajectory dR between two successive presses A and B spaced apart by a sampling period Te (see FIG. 2) is furthermore determined.

Next, the length of displacement of the control trajectory dR is compared with a predetermined distance and a stationary trajectory is assigned to the control trajectory if the length of displacement of the control trajectory dR is less than the predetermined distance.

For example, the predetermined distance is of the order of 4 millimeters.

Advantageously, the stationary trajectory allows a validation or a function selection.

Furthermore, it is also possible that after the comparison of the recognition step, the shape of the predefined trajectory is assigned to the control trajectory only if the shape of the predefined trajectory satisfies an additional validation criterion.

The additional validation criterion is satisfied for example when a pressing force detected on the touch surface is greater than a predefined force.

According to another example, the validation criterion is satisfied when the predefined trajectory is identical to the control trajectory assigned at least in the course of the previous recognition step.

Figure 5:
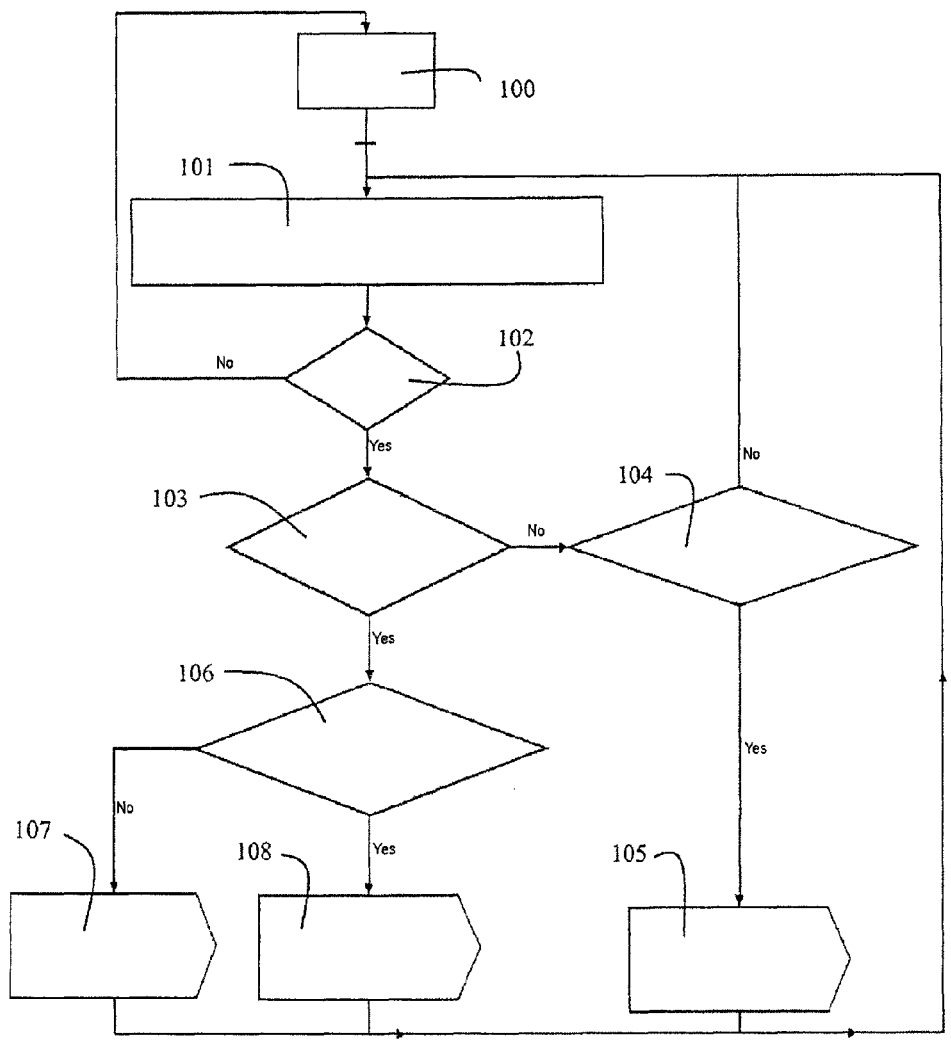

FIG. 5 illustrates an exemplary control method.

A first step 100 involves waiting for the control device to detect a press on the touch surface 1.

When a press is detected, the control trajectory is sampled so as to determine a sampled angle dθ of the control trajectory for each sampling period Te in the course of a predetermined duration dT (step 101).

A length of displacement of the control trajectory dR is also determined.

At the end of the predetermined duration dT, if pressing is no longer detected, then the method returns to the initial step 100 of waiting for a press.

If a press is detected until the end of the predetermined duration dT, then the length of displacement of the control trajectory dR is compared with a predetermined distance 103.

If the length of displacement of the control trajectory dR is less than the predetermined distance, then it is determined whether the detection time has been sufficient (step 104), for example, whether the detection time has been greater than 500 msec.

If the detection time has been less than this minimum detection time, then step 101 is returned to and the detection of a new displacement is awaited.

If the detection time is greater than the minimum detection time, then a stationary trajectory is assigned to the control trajectory (step 105) and the method is repeated by returning to step 101 of waiting for a displacement.

If, on the other hand, the length of displacement of the control trajectory dR is greater than the predetermined distance, then a parameter representative of the evolution of the sampled angles dθ is compared in the course of the predetermined duration dT, with a predetermined threshold.

If the parameter is less than or equal to the threshold then a rectilinear trajectory is assigned to the control trajectory (step 107) and the method is repeated at step 101.

If the representative parameter is greater than the predetermined threshold, a circular trajectory is assigned to the control trajectory (step 108) and the method is repeated by returning to step 101 of waiting for displacement.

Such a control method, in which a parameter representative of the evolution of at least two sampled angles dθ is compared with a predetermined threshold so as to ascribe a predefined trajectory shape to the control trajectory, enables a multitude of electronic systems and functions to be controlled by a microcontroller of small capacity and low cost.

The invention claimed is:

1. A method of controlling a touch-surface control device comprising recognizing a shape of a control trajectory on a touch surface from among at least two predefined trajectory shapes, wherein shape recognition comprises, in the course of a predetermined duration:
sampling the control trajectory to determine a sampled angle of the control trajectory for each sampling period;
comparing a parameter representative of the evolution of at least two sampled angles with a predetermined threshold, wherein the representative parameter is a standard deviation of the sampled angles with respect to a mean of the sampled angles;
assigning a predefined trajectory shape to the control trajectory as a function of a result of the comparison;
determining a length of displacement of the control trajectory;
comparing the length of displacement of the control trajectory with a predetermined distance; and
assigning a stationary trajectory to the control trajectory if the length of displacement of the control trajectory is less than the predetermined distance,
wherein a circular trajectory is assigned to the control trajectory when said representative parameter is greater than the predetermined threshold, and wherein a rectilinear trajectory is assigned to the control trajectory when said parameter is less than or equal to said threshold, wherein the circular or rectilinear trajectories allow parametrization of a control.

2. The control method as claimed in claim 1, wherein the stationary trajectory allows a validation or a function selection.

3. The control method as claimed in claim 1, wherein, after the comparison of the shape recognition, the shape of the predefined trajectory is assigned to the control trajectory if the shape of the predefined trajectory satisfies an additional validation criterion.

4. The control method as claimed in claim 3, wherein the additional validation criterion is satisfied when a pressing force detected on the touch surface is greater than a predefined force.

5. The control method as claimed in claim 1, wherein the sampling period is variable.

6. A control device comprising a touch surface, wherein the touch surface comprises:
a processing unit for the implementation of a control method, comprising:
recognizing a shape of a control trajectory on a touch surface from among at least two predefined trajectory shapes, wherein shape recognition comprises, in the course of a predetermined duration:
sampling the control trajectory to determine a sampled angle of the control trajectory for each sampling period;
comparing a parameter representative of the evolution of at least two sampled angles with a predetermined threshold, wherein the representative parameter is a standard deviation of the sampled angles with respect to a mean of the sampled angles;

assigning a predefined trajectory shape to the control trajectory as a function of a result of the comparison;

determining a length of displacement of the control trajectory;

comparing the length of displacement of the control trajectory with a predetermined distance; and assigning a stationary trajectory to the control trajectory if the length of displacement of the control trajectory is less than the predetermined distance, wherein a circular trajectory is assigned to the control trajectory when said representative parameter is greater than the predetermined threshold, and wherein a rectilinear trajectory is assigned to the control trajectory when said parameter is less than or equal to said threshold, wherein the circular or rectilinear trajectories allow parametrization of a control.

7. The control device as claimed in claim 6, wherein the control device is configured to control the functions of at least one set of electrical or electronic members of a motor vehicle.

8. The control device as claimed in claim 7, wherein the at least one set of electrical or electronic members of a motor vehicle comprise at least one selected from a group consisting of an air-conditioning system, an audio system, a navigation system, a telephone system, motorized window winder controls, controls for adjusting exterior rear-view mirrors, controls for adjusting the position of a sunroof, controls for interior lighting, and controls for adjusting a motor vehicle seat.

* * * * *